UNITED STATES PATENT OFFICE.

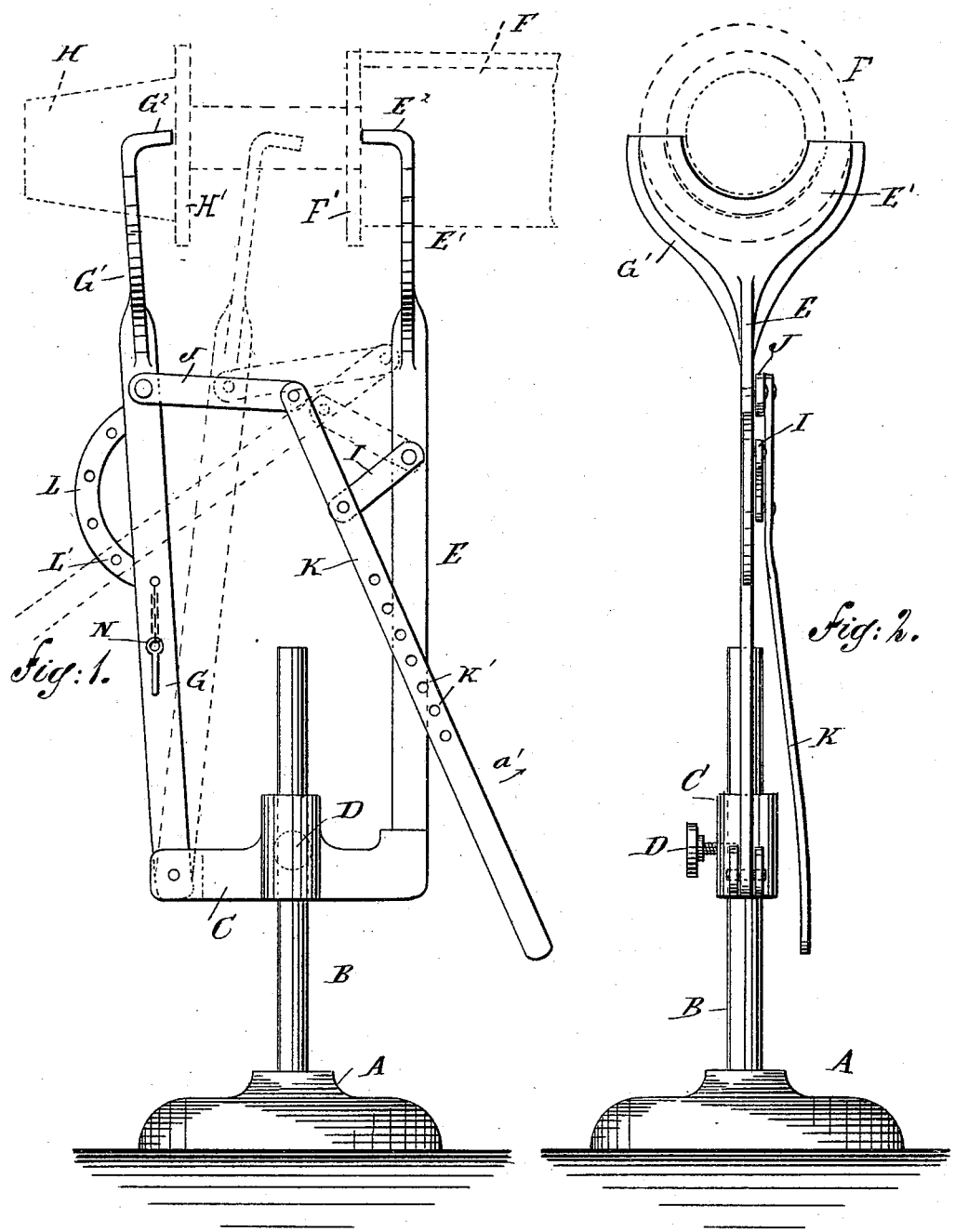

WALTER HEWITT ROBINSON, OF ST. PAUL, MINNESOTA, ASSIGNOR TO ROBINSON & TAYLOR, OF SAME PLACE.

CLAMP.

SPECIFICATION forming part of Letters Patent No. 493,118, dated March 7, 1893.

Application filed August 24, 1892. Serial No. 443,988. (No model.)

*To all whom it may concern:*

Be it known that I, WALTER HEWITT ROBINSON, of St. Paul, in the county of Ramsey and State of Minnesota, have invented a new and Improved Clamp, of which the following is a full, clear, and exact description.

The invention relates to clamps such as shown and described in the Letters Patent, No. 471,436, granted to me on March 22, 1892.

The object of the present invention is to provide a new and improved clamp, which is simple and durable in construction, and can be readily applied and manipulated for conveniently removing or replacing the cap and spring in air brake cylinders.

The invention consists of certain parts and details, and combinations of the same, as will be hereinafter described and then pointed out in the claims.

Reference is to be had to the accompanying drawings forming a part of this specification, in which similar letters of reference indicate corresponding parts in both the figures.

Figure 1 is a side elevation of the improvement as applied; and Fig. 2 is an end elevation of the same.

The improved clamp is provided with a suitably constructed base A, on which is secured a post B, carrying a bracket C, held vertically adjustable on the said post and adapted to be secured in place by a set screw D, or other means. On the bracket C is secured an upwardly-extending arm E, provided at its upper end with a fork E', adapted to engage the under side of the brake cylinder F, the ends of the fork arm being provided with inwardly-extending lugs $E^2$, adapted to abut against the inside of the flange F', of the said cylinder, as plainly indicated in Fig. 1. On the bracket C and directly opposite the arm E is pivoted an arm G, also provided on its upper free end with a fork G', adapted to engage the under side of the cap H, for the brake cylinder F. The ends of the fork G' are provided with inwardly-extending projections or lugs $G^2$, adapted to engage the outer face of the flange H', of the cap H. A link I, is pivotally-connected with the fixed arm E and a like link J, is pivotally-connected with the pivoted arm G, the said links being also connected with a lever K, adapted to be manipulated by the operator so as to move the pivoted arm G toward and from the other fixed arm E. In the lever K is arranged a series of apertures K', for the insertion of a pin which is also adapted to pass through an aperture of a series of apertures L', formed in a segment L, secured on the pivoted arm G. When the pin engages the said lever K and arm L, the lever is locked in position so as to bring the two arms G and E in the desired position.

The operation is as follows: When it is desired to remove the spring and cap H from the brake cylinder F, then the lever K is swung into the position indicated in dotted lines in Fig. 1, so that the lugs $E^2$ and $G^2$ of the arms E and G respectively, engage the flanges F' and H', respectively, of the cylinder F and cap H. The lever is then locked in place by a pin passing through registering apertures K' and L' in the lever K and arm L. The operator now conveniently removes the bolts or other fastening devices connecting the cap to the cylinder, and after this has been done, the operator withdraws the pin so as to unlock the lever K, which latter is taken hold of by the operator and moved in the direction of the arrow $a'$ so that the pivoted arm G swings gradually outward, it being understood that the said arm is pressed on very heavily by the spring contained in the cylinder and pressing against the cap H. By this gradual movement of the lever K, the cap is conveniently carried outward until the force of the spring is expended. The cap is then lifted out of the fork G' and the spring removed. The cylinder can then be cleaned in the usual manner after which the spring and cap are again inserted in the fork G' of the arm G, the spring with the piston extending into the cylinder F. The operator now moves the lever K in the inverse direction of the arrow $a'$, until the flange H' of the cap H again abuts on the flange F' of the cylinder F. The operator then inserts the locking pin to fasten the lever K in place so as to hold the arm G in a locked position. The operator can then conveniently apply the fastening devices so as to fasten the cap to the cylinder.

Having thus fully described my invention, I claim as new and desire to secure by Letters Patent—

1. In a clamp of the character described, the combination with a fixed and a pivoted arm, of a link pivoted to the pivoted arm, a lever to the end of which the said link is pivoted, a link pivoted to the fixed arm and to the lever, and means for locking the said lever in position, substantially as described.

2. In a clamp of the class described, the combination with a base and a post set thereon, of a bracket held adjustably on the said post, a fixed arm carried by the said bracket, a second arm pivoted on the said bracket, and a mechanism for connecting the said pivoted arm with the fixed arm to move the former toward and from the said fixed arm, substantially as shown and described.

3. In a clamp, of the class described, the combination with a base provided with a post, a bracket held vertically adjustable thereon, an arm secured on the said bracket and provided with a fork, a second arm pivoted on the said bracket and also provided at its free end with a fork, links pivotally connected with the said arms, and a lever pivoted to the said links, substantially as shown and described.

4. In a clamp, of the class described, the combination with a base provided with a post, a bracket held vertically adjustable thereon, an arm secured on the said bracket and provided with a fork, a second arm pivoted on the said bracket and also provided at its free end with a fork, links pivotally connected with the said arms, a lever pivoted to the said links, and a locking mechanism for fastening the said lever in position, as set forth.

WALTER HEWITT ROBINSON.

Witnesses:
GUDBRAND J. LOMER,
GEORGE W. RIDDELL.